Feb. 24, 1925.
B. C. ROCKWELL
1,527,225
VENEERING MACHINE
Filed May 16, 1922
4 Sheets-Sheet 1
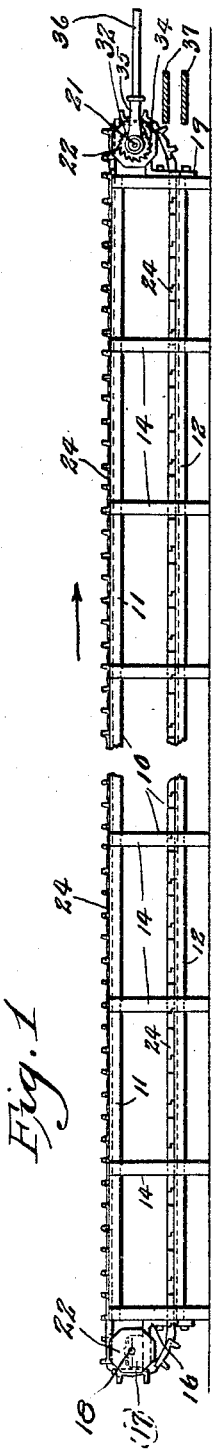
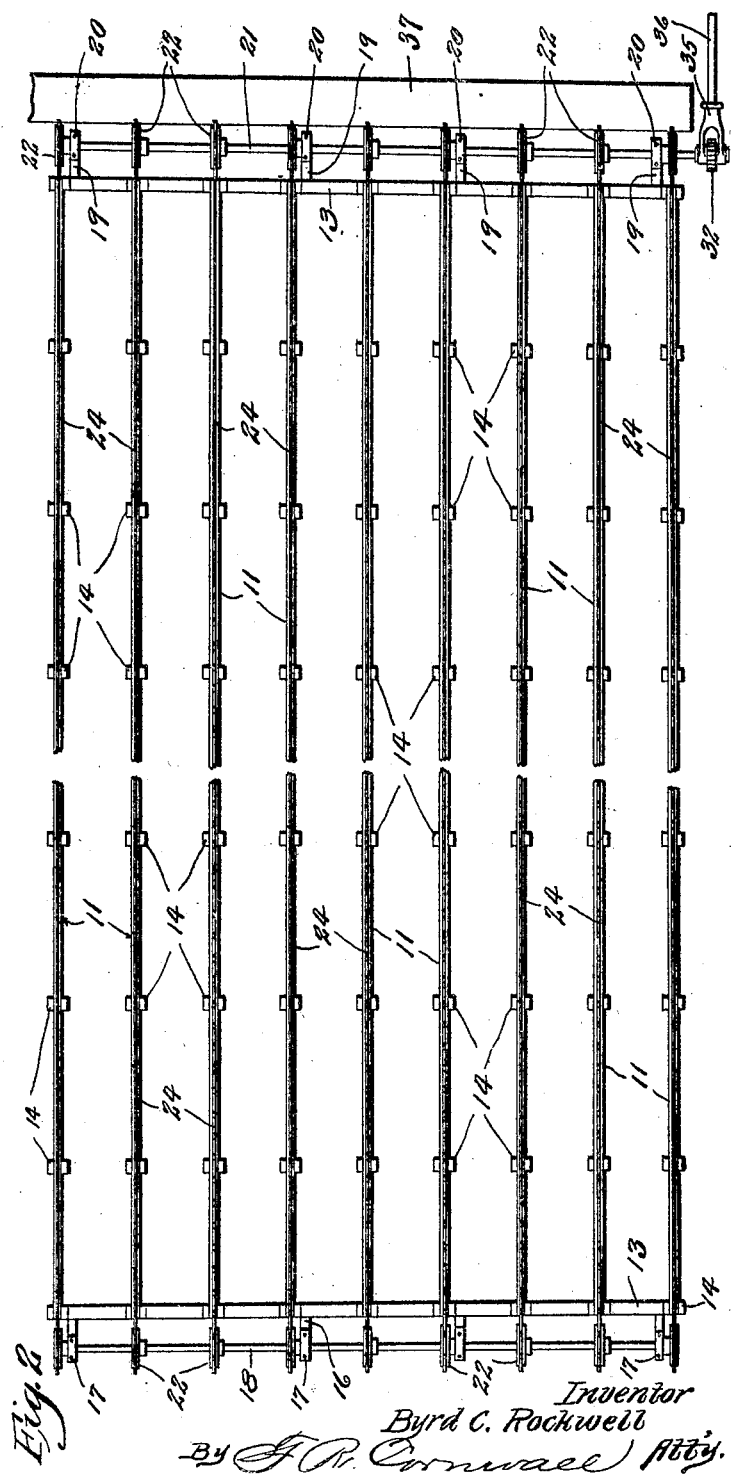
Inventor
Byrd C. Rockwell
By F. R. Cornwall Atty.

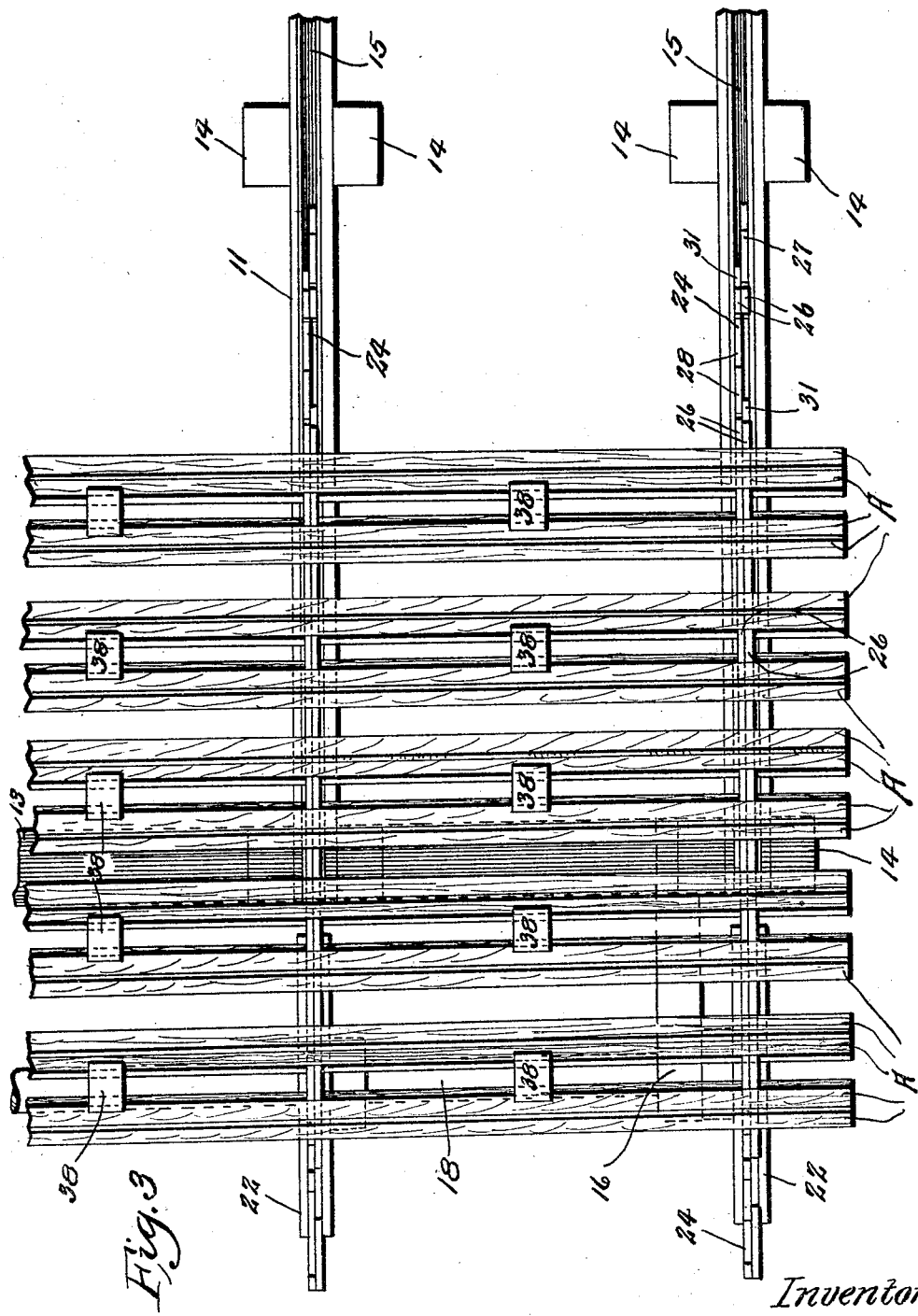

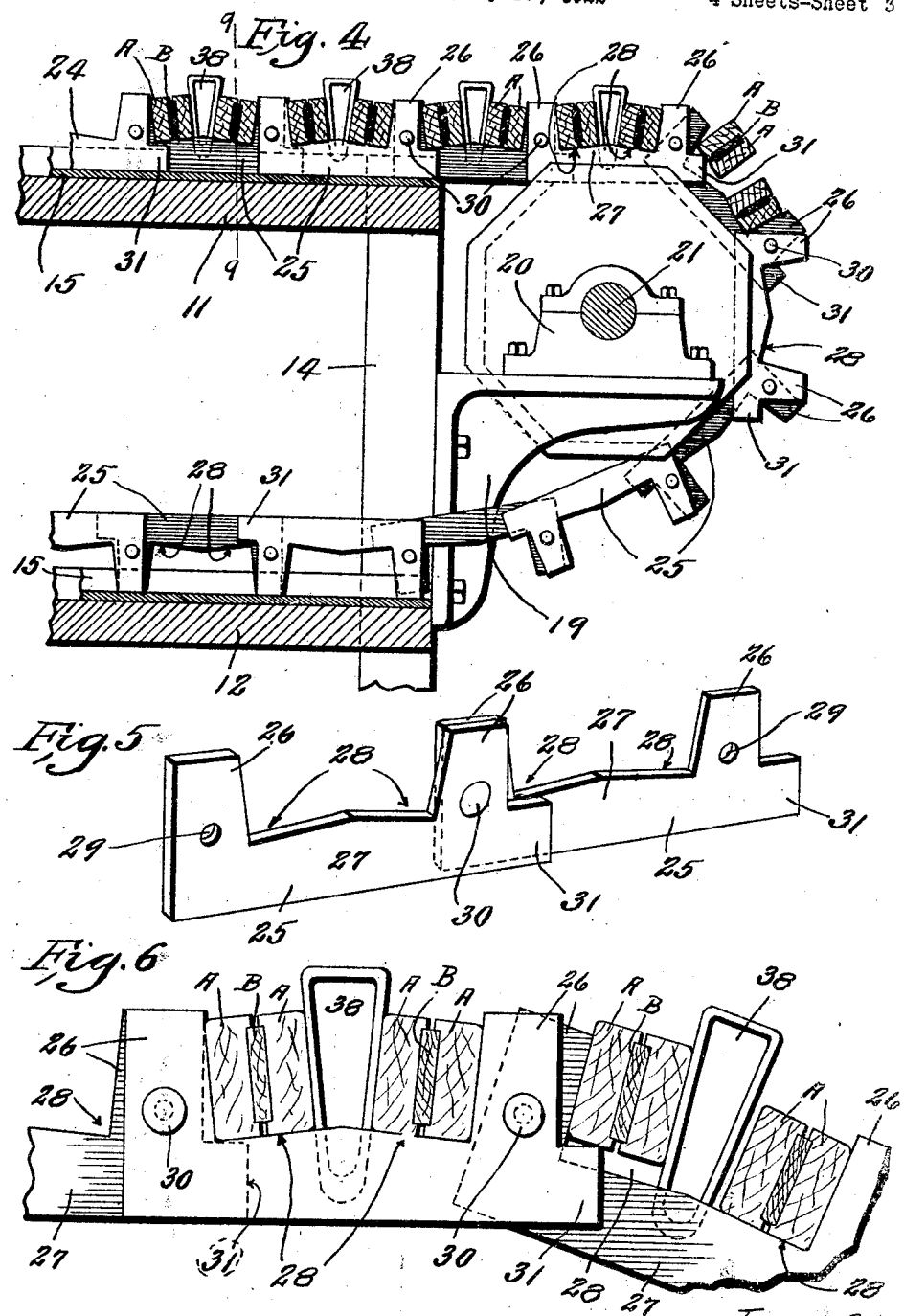

Feb. 24, 1925.
B. C. ROCKWELL
VENEERING MACHINE
Filed May 16, 1922      4 Sheets-Sheet 4
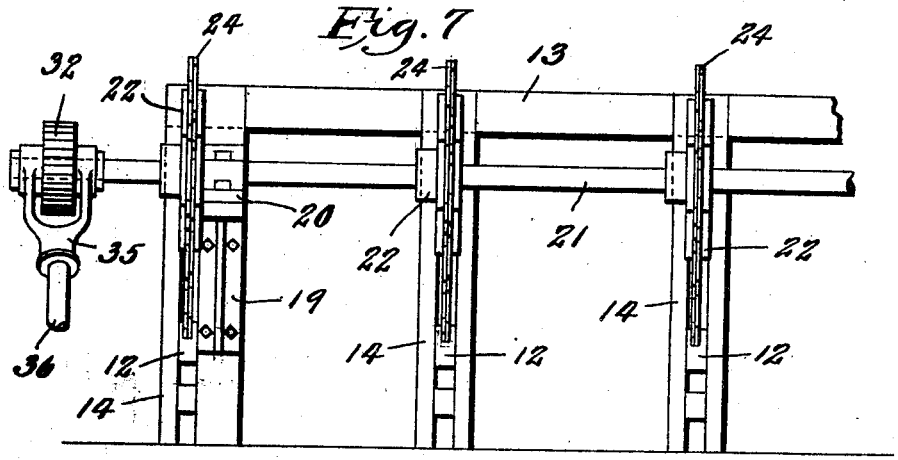
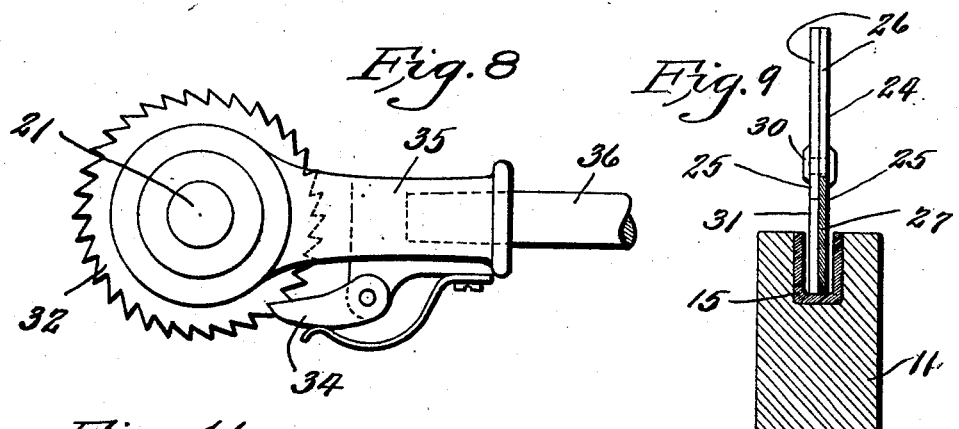
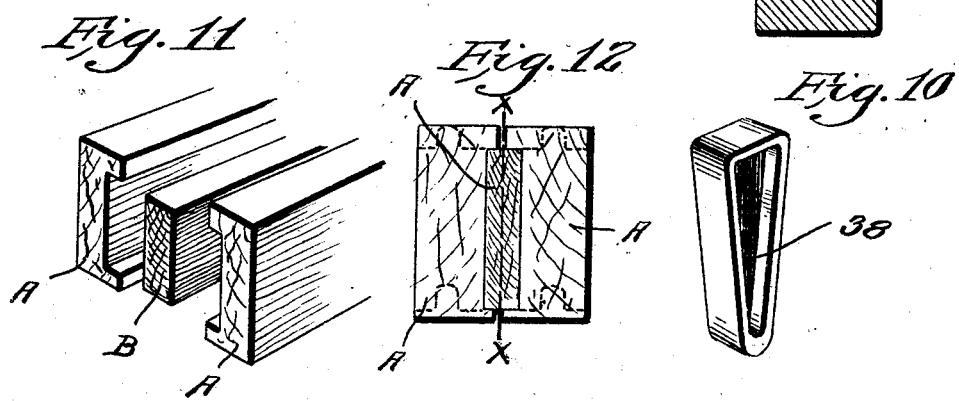
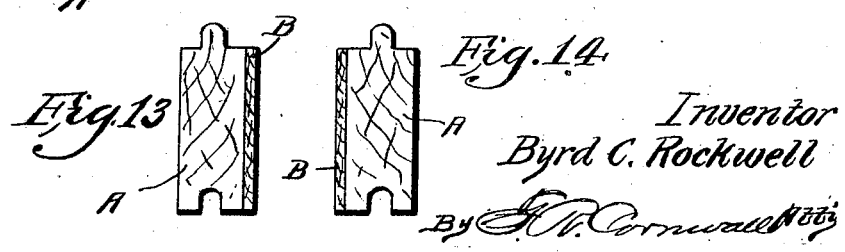
Inventor
Byrd C. Rockwell Patented Feb. 24, 1925.

1,527,225

UNITED STATES PATENT OFFICE.

BYRD C. ROCKWELL, OF CAMDEN, ARKANSAS.

VENEERING MACHINE.

Application filed May 16, 1922. Serial No. 561,431.

*To all whom it may concern:*

Be it known that I, BYRD C. ROCKWELL, a citizen of the United States, residing at the city of Camden, county of Ouachita, State of Arkansas, have invented a certain new and useful Improvement in Veneering Machines, of which the following is a full, clear, and exact description, such as will enable others skilled in the art to which it appertains to make and use the same, reference being had to the accompanying drawings, forming part of this application.

This invention relates generally to veneering machines and more particularly to machines for manufacturing veneered lumber such as disclosed in United States Letters Patent No. 1,394,120, granted to me October 18, 1921, and United States Letters Patent No. 1,446,810, granted to me February 27, 1923.

The objects of my invention are to simplify the manufacture of veneered lumber and to provide simple and inexpensive means for practicing this method.

Further objects of my invention are to provide a veneering machine designed to receive the assembled strips of lumber and hold said lumber under pressure for a definite length of time to allow the adhesive used in the manufacture of veneered lumber to set and securely bind the assembled strips in their proper relation; to provide means for automatically releasing and discharging said strips at the proper time or location.

Still further objects of my invention are to provide suitable carriers having seats for receiving the lumber and to provide removable members designed to be driven into position in order to hold said lumber under pressure in said seats.

With these and other objects in view, my invention consists in certain novel features of construction and arrangements of parts hereinafter described and claimed, and illustrated in the accompanying drawings, in which:—

Figure 1 is a side elevational view of the machine partly broken away.

Figure 2 is a plan view of same.

Figure 3 is an enlarged fragmental plan view of the forward or receiving end of the machine showing the lumber in position thereon.

Figure 4 is a detail vertical cross section of the rear or discharge end of the machine.

Figure 5 is a perspective detail view of two of the carriers.

Figure 6 is a side elevational detail view of one of the conveyors illustrating the manner in which the lumber is released from its seat.

Figure 7 is an end view of a portion of the rear or discharging end of the machine.

Figure 8 is a detail view of manually operable means for actuating the conveyors.

Figure 9 is a vertical cross section taken on line 9—9 of Figure 4.

Figure 10 is a perspective detail view of one of the spacing or wedge members used in securing the lumber under pressure in its position on the conveyors.

Figure 11 shows a perspective detail view of the core or base strips and the veneer strip illustrating the manner in which they are put together preparatory to the veneering operation.

Figure 12 is an end view of the assembled strips of lumber.

Figures 13 and 14 are end views of the finished strips.

The present invention relates to a machine for manufacturing veneered lumber in accordance with the method disclosed in the above mentioned patent and co-pending application. This method briefly consists in forming the core or base strips of lumber A, then applying by means of a suitable adhesive a comparatively thin strip B of high grade lumber to said core strips. The assembled strips are then placed on the conveyors of the veneering machine wherein they are placed under pressure in order to hold said strips in their proper relation and allow the adhesive to set. The assembled lumber is removed from the machine and sawed longitudinally along the line as indicated by x—x in Figure 12, and the sawed strips are then finished in any suitable maner.

The veneering machine is supported by framework 10 which consists of a series of longitudinally disposed channel members 11 and 12 supported at regular intervals by uprights 14. Horizontally disposed bars 13 reinforce and space the forward and rear ends of the channel members 11. Channel members 12 are arranged a suitable distance below channel members 11 and in vertical alinement therewith and the channels of both series of channel members 11 and 12 are preferably lined with a metal lining 15.

Projecting outwardly from the forward end of the supporting framework 10, and supported thereby are brackets 16 and carried by these brackets are bearings 17 in which is journaled a horizontally disposed shaft 18. Projecting rearwardly from the rear end of the support 10 are brackets 19 having bearings 20 in which is journaled a horizontal shaft 21. These shafts have fixed thereon a plurality of pulleys 22 which are in alinement with the channels of the corresponding members 11 and 12.

Operating in channel members 11 and 12 and over pulleys 22 are endless conveyors or chains 24. Each conveyor consists of a plurality of carriers or links 25, each of which is pivotally connected near its ends to the adjacent carriers. Each link or carrier is formed with two upwardly projecting arms 26 spaced from each other and having their inner sides or edges inclined upwardly and outwardly in opposite directions. The upper edge of the horizontal portion 27 which unites the lower ends of arms 26 is angularly disposed sloping downwardly from the center toward said arms, so as to provide angularly disposed seats 28 for receiving the assembled strips of lumber.

Apertures 29 are formed in each carrier near the ends thereof for receiving rivets 30 by means of which the carriers 25 are pivotally connected together.

Projecting outwardly from the forward end of each carrier or link 25 is a horizontal toe portion 31 which normally, or as long as the preceding carrier is alined with the carrier on which said toe portion is formed, occupies a position below the horizontal plane of seats 28, as shown in Figure 4. When, however, one of the carriers assumes an angular position, the toe portion of the following carrier will be exposed and will engage the lumber occupying one of the seats of the preceding angularly disposed carrier and cause said lumber to be displaced from said seat. Pulleys 22 are polygonal in shape in order to properly engage the links or carriers 25 of conveyors 24 and are preferably circumferentially grooved to prevent accidental displacement of the conveyors.

Shaft 21 has fixed to one of its ends a ratchet wheel 32 and co-operating with the latter is a spring-pressed pawl 34 pivotally mounted on casting 35. This casting is loosely mounted on shaft 21 and is provided with a socket for receiving a handle or rod 36 by means of which casting 35 can be manually oscillated to turn wheel 32 and shaft 21 in the proper direction to operate conveyors 24.

A belt conveyor 37 is arranged at the rear end of the machine below shaft 31 and serves to receive and carry away lumber discharged from the machine.

Wedge shaped blocks 38 are designed to be forced at suitable intervals between each pair assembled strips of lumber and hold said strips of lumber under pressure to their seats.

Pulleys 22 on shaft 21 are in alignment with the channel members 11 and 12 and with pulleys carried by shaft 18, and the carriers of each conveyor are in transverse alignment with the respective carriers of the other conveyors.

In the operation of the machine, a pair of assembled strips of lumber are placed at the rear or receiving end of the machine transversely of the conveyors 24 and occupy the oppositely disposed seats of the respective aligned carriers. By virtue of the inclined inner edges of arms 26 and the corresponding inclined upper edge of horizontal portion 27, the assembled strips of lumber will be angularly disposed, their inner side walls being inclined upwardly and outwardly, as indicated in Figure 6. Wedge members 38 are then driven at proper intervals between each pair of strips of lumber, thus placing said lumber under pressure and holding the assembled strips in proper relation. The machine is intermittently operated by handle 36 so as to present a new set of transversely aligned carriers 25 in the receiving position at the same time moving the lumber already in position on the machine gradually towards the discharge end of said machine. Upon reaching the discharging end of the machine, each set of aligned carriers in passing over the pulleys carried by shaft 21 is deflected downwardly at an angle to the following series of carriers. This exposes the toe portions carried by the forward ends of the last mentioned set of carriers and said toe portions are thus brought into engagement with the underside of one of the assembled strips carried by the angularly disposed set of carriers and causes this strip member to be displaced from its seat, as shown in Figure 6. This displacement disengages the wedge member 38 so that both pieces of lumber can be readily removed from their respective seats and placed on the belt conveyor 37 to be carried away. The length of the machine and the time required to move the work from the forward or receiving end of said machine to the rear or discharge end thereof is calculated so as to allow sufficient time for the setting and drying of the adhesive used in the manufacture of the veneered lumber so that the lumber upon reaching the discharge end of the machine can be handled without danger of displacing the assembled strips.

A veneering machine constructed according to my invention is of simple and durable construction, can be easily operated by an inexperienced person, is inexpensive to manufacture and operate.

While I have shown the preferred form of my veneering machine, it is obvious that various changes in the construction and arrangements of parts can be made and substituted for those herein shown and described without departing from the spirit of my invention.

What I claim is:—

1. A veneering machine comprising a plurality of endless carriers each of which is comprised of a series of pivotal interengaged plates having work receiving members adapted to receive the work transversely of said carriers, said work being arranged in pairs, a support therefor, and a plurality of displaceable wedging blocks adapted to be inserted between each pair of work pieces intermediate of said carriers for locking the work in engagement with said receiving members, 2. A veneering machine comprising a plurality of endless carriers having spaced members for receiving the work therebetween, and wedge members for engaging said work and placing it under pressure, said members having their opposing faces inclined to so position the work as to receive said wedging members between said work.

3. A veneering machine comprising a series of work receiving endless conveyors adapted to receive and maintain strips of lumber in transverse positions, a plurality of removable blocks adapted to be forced between each pair of said strips of lumber and means on the individual members of said conveyors for discharging said strips.

4. A veneering machine comprising a series of work receiving endless conveyors adapted to receive and maintain strips of lumber transversely relative thereto, a plurality of removable blocks adapted to be forced between each pair of said strips of lumber, means on the individual members of said conveyors for discharging said strips of lumber, and means for operating said conveyors in one direction.

5. A veneering machine comprising a series of endless conveyors designed to receive the assembled lumber and a plurality of displaceable blocks for clamping said lumber in position on said conveyors, said conveyors consisting of a plurality of carriers articulated together, each carrier being provided with an outwardly projecting portion, which, when the preceding carrier occupies an angular position, engages and displaces the lumber carried by said angularly disposed carrier.

6. A veneering machine comprising a support, a series of conveyors movably mounted thereon, each conveyor being provided with a plurality of seats for receiving strips of lumber arranged in pairs, and a plurality of displaceable blocks for engaging each pair of lumber pieces and holding the latter under pressure in said seats and means on said conveyors for displacing said blocks.

7. A veneering machine comprising a support, a plurality of articulated work-engaging carriers movably mounted on said support, each carrier being provided with oppositely disposed seats for receiving a pair of assembled lumber pieces, a plurality of wedge members for engaging said lumber pieces and placing them under pressure and means on each carrier for releasing the wedge members of the adjacent carrier.

8. A veneering machine comprising a support, a plurality of articulated work engaging carriers movably mounted on said support, each carrier being provided with oppositely disposed seats for receiving a pair of assembled lumber pieces and a plurality of wedge members for engaging said lumber pieces and placing them under pressure, and means on each carrier adapted to engage and displace the lumber arranged on the preceding carrier.

9. A veneering machine comprising a support, a plurality of articulated work engaging carriers movably mounted on said support, each carrier being provided with oppositely disposed seats for receiving a pair of assembled lumber pieces, a plurality of wedge members for engaging said lumber pieces and placing them under pressure, and means for intermittently operating said carriers, each carrier being provided with a projection for engaging and displacing the lumber carried by the preceding carrier when the latter reaches the discharging position.

10. A veneering machine comprising a plurality of articulated carriers each of which is provided with seats for engaging work and with a portion projecting forward towards the preceding carrier, and displaceable members for wedging said work in position in said carriers and adapted to be displaced at the appropriate time by the projecting portions of the following carriers.

11. In a veneering machine, an endless conveyor comprising a plurality of pivotal interengaging carriers, each carrier being provided with oppositely disposed seats for receiving work and with a projecting portion adapted when the preceding carrier assumes a discharging position to displace work therefrom.

12. A veneering machine comprising stationary longitudinally grooved supports, endless conveyors consisting of links operating in said supports, each conveyor link having oppositely disposed portions engaging a pair of lumber pieces and a heel portion for discharging at the appropriate time the work carried by the adjacent link, removable spacing means adapted to be forced at spaced intervals between each pair of said lumber pieces and displaceable by the heel portions of the adjacent links, and actuating means rotatably mounted on said support for simultaneously operating all of said conveyors.

13. A veneering machine comprising a stationary support, endless link conveyors movably mounted in said support, each link having oppositely disposed angularly arranged seats for engaging a pair of lumber pieces, removable wedge blocks adapted to be forced at spaced intervals between each pair of said lumber pieces, means for actuating said conveyors, and means on each conveyor link for engaging at a predetermined time one of the lumber pieces carried by a preceding link and displacing said piece and releasing said wedge blocks.

14. A veneering machine comprising a stationary support, endless link conveyors movably mounted in said support, each link having oppositely disposed angularly arranged seats for engaging a pair of lumber pieces, removable wedge blocks adapted to be forced at spaced intervals between each pair of said lumber pieces, means for actuating said conveyors, means on each conveyor link for engaging at a predetermined time one of the lumber pieces carried by a preceding link and displacing said piece and releasing said wedge blocks, and means for receiving and carrying away the work discharged from said machine.

In testimony whereof I hereunto affix my signature this 8th day of May, 1922.

BYRD C. ROCKWELL.